United States Patent [19]
Klein

[11] Patent Number: 5,291,794
[45] Date of Patent: Mar. 8, 1994

[54] METHOD AND APPARATUS FOR MONITORING MECHANICAL POWER TRANSMISSION SYSTEMS

[75] Inventor: Friedrich Klein, Aalen, Fed. Rep. of Germany

[73] Assignee: Micro-Epsilon Messtechnik GmbH & Co. KG, Ortenburg, Fed. Rep. of Germany

[21] Appl. No.: 878,942

[22] Filed: May 5, 1992

[30] Foreign Application Priority Data

May 15, 1991 [DE] Fed. Rep. of Germany ....... 4115786

[51] Int. Cl.⁵ .................................................. G01L 1/00
[52] U.S. Cl. ............................... 73/862.541; 164/4.1;
                                                 73/862.625
[58] Field of Search ............... 73/862.541, 862.542,
                         73/849, 862.625, 862.626; 164/4.1, 150;
                                              361/280; 336/30

[56] References Cited

U.S. PATENT DOCUMENTS

| | | | |
|---|---|---|---|
| 3,354,704 | 11/1967 | Gloor | 73/849 |
| 3,840,313 | 10/1974 | Grundmann et al. | 425/171 |
| 4,453,421 | 6/1984 | Umano | 73/862.542 |
| 4,598,758 | 7/1986 | Nyland et al. | 164/4.1 |
| 4,964,306 | 10/1990 | Jacobson et al. | 73/862.625 X |
| 5,161,594 | 11/1992 | Bolton et al. | 73/862.541 |

FOREIGN PATENT DOCUMENTS

| 1074222 | 7/1960 | Fed. Rep. of Germany . |
|---|---|---|
| 2928940 | 10/1984 | Fed. Rep. of Germany . |

Primary Examiner—Donald O. Woodiel
Assistant Examiner—Elizabeth L. Dougherty
Attorney, Agent, or Firm—Bell, Seltzer, Park & Gibson

[57] ABSTRACT

A method for monitoring mechanical power transmission systems is disclosed, wherein the power transmission system includes at least one power transmitting element, and which is characterized for a reliable and simple measurement of elongations on the power transmitting element by the following steps: First two substantially parallel planes are established on the unstressed power transmitting element, each plane being defined by at least three space coordinates or respectively measuring points on the power transmitting element. Then, the relative change in position of the two planes to one another is determined on the stressed power transmitting element. Finally, the determined relative change in position of the planes is correlated with the local elongation or compression on the power transmitting element. An apparatus for carrying out the method is likewise described.

27 Claims, 4 Drawing Sheets

METHOD AND APPARATUS FOR MONITORING MECHANICAL POWER TRANSMISSION SYSTEMS

BRIEF SUMMARY OF THE INVENTION

The invention relates to a method of monitoring mechanical power transmission systems, wherein the power transmission system comprises at least one power transmitting element. Furthermore, the invention relates to an apparatus for monitoring mechanical power transmission systems, in particular for carrying out the method of the present invention.

Power transmission systems in the meaning of the present invention are systems, wherein forces are transferred to a tool or the like, such as, for example presses, punches, extrusion press installations, forging hammers, injection molding machines, chill casting installations, etc. The power transmission systems utilized in the foregoing apparatus all comprise at least one power transmitting element which exerts a predeterminable force on the tool. Within the scope of this power transmission, the power transmitting element is subjected to great stresses and thus accordingly to great elongations and/or compressions. Bending stresses and/or bending moments which occur simultaneously, are normally the cause for the failure of the power transmitting element, when the fatigue strength of the material is exceeded. Consequently, it is almost absolutely necessary for the purpose of avoiding damage to the power transmitting element, to monitor the power transmission system or respectively element as regards elongations or compression and stress respectively occurring in the course of power transmission, i.e., also as regards the occurrence of maximum bending moments. In particular, this monitoring is necessary, inasmuch as frequently the tools connected with the power transmitting elements are incorrectly adjusted or exhibit unintentionally any kind of foreign bodies in their operating range. These facts lead, when tool parts impact on one another, to at least a slight tilting, which in turn causes a bending of the power transmitting element operatively connected with the tool. This bending may easily lead to a stress above the prolonged alternating stress strength.

Known from practice as of now are methods and apparatus for monitoring the mechanical power transmission systems under discussion. This will be explained below with reference to the example of a pressure die casting machine:

According to DIN (German Industrial Standards) 24480, sheet 2, a pressure die casting machine is divided into four subassemblies, namely: a die closing unit, a casting unit, an ejecting unit and a core withdrawing unit. The die closing unit serves to shift the movable die halves, thereby closing the die, keeping it closed, and opening it again. The die closing unit which must, among other things, apply the required holding force, includes a stationary clamping plate, a movable clamping plate, and columns which on the one hand serve to guide the movable clamping plate, and on the other hand to absorb the holding force generated by the die closing unit. These machine parts which are named columns in pressure die casting machines, are power transmitting elements in the meaning of the present invention.

To avoid an overload of the column, which ultimately may lead, according to the foregoing description to a breakage of the column or a breakage of the power transmitting element, it has in the past been possible to monitor the columns in different ways. Thus, for example, the holding force of the die closing unit is measured, i.e., the force at which the closing unit with a certain tool counteracts the occurrence of a die bursting force. To this end, a so-called "cushion" is mounted in known manner between the stationary and the movable clamping plate, by which a force is applied hydraulically. The force applied via the "cushion" corresponds to the holding force of the pressure die casting machine, when it barely holds closed.

Furthermore, it is possible to determine tensile and compressive forces via the elongations in the columns, inasmuch as in accordance with the Hooke Law, a linear relationship exists in the elastic range between the stress occurring in the column and the elongation. To measure this elongation under stress, various methods are in turn available in practice. On the one hand, the length variation of a column under stress is measured on the front end of the column in the so-called neutral axis. Bending stresses in the column are not measured in this process. Furthermore, it is possible to measure the length variation under stress on a certain segment in the region of the die. To this end, it is possible to use dial gauges which indicate the movement of the column via blocks and a steel strip clamping. The blocks may also be mounted on the columns adhering thereto by means of a magnetic tape.

Finally, a method is known, by which wire-strain gauges are applied to the columns. The measuring principle of a wire-strain gauge is based on the change in resistance of an electric conductor, when the latter is elongated or compressed by the action of force. However, the application of wire-strain gauges necessitates a substantial expenditure. When pulling the column, the measuring assembly is normally destroyed, which makes this method extremely expensive. The measuring results are always dependent on the position of the wire-strain gauge, so that for a complete monitoring of the power transmitting system or element under discussion, it would be necessary to provide same with wire-strain gauges practically over its entire surface. However, this is impossible for reasons of both practicability and costs.

The above-described known methods of monitoring mechanical power transmission systems either can be carried out only within the scope of a "blank determination", or cause on the other hand a considerable expenditure of time and costs.

It is therefore the object of the present invention to indicate a method of monitoring mechanical power transmission systems, which enables in a simple manner a reliable monitoring of the power transmission system during its operation. It is another object to describe a corresponding apparatus for applying the method of the present invention, it being possible to variably use the apparatus in different power transmission systems.

In accordance with the invention, the method of monitoring mechanical power transmission systems solves the foregoing problem, and comprises the following steps: first, two planes arranged substantially parallel to one another are plotted on the unstressed power transmitting element, with each plane being defined by at least three space coordinates or measuring points on the power transmitting element. With respect to the latter, in the present invention these two planes are established directly on the power transmitting element. The next step of the method occurs on the power transmitting element under stress. In the stressed condition, the change in position of the two planes relative to one another is determined, which is caused by the stress or elongation occurring in the power transmitting element. Finally, the determined relative change in position of the planes is correlated with the local elongation or compression occurring on the power transmitting element, with the Hooke Law applicable to the elastic range forming the basis.

At this point, it should be briefly pointed out that the change in position of the two concerned planes relative to one another as a result of an elongation or compression of the power transmitting elements occurs in direction of the power transmission. The term elongation is defined as a change in length with respect to the overall length, the latter being the distance between the planes in the unstressed condition of the power transmitting element. Accordingly, the elongation $\epsilon$ results from $$\epsilon = dl/l$$

with 1 being the distance between the planes in the unstressed condition of the power transmitting element and dl the change in position.

The tensile stress $\sigma z$ results according to the Hooke Law from the elongation and the material-specific modulus of elasticity E as follows:

$$\sigma z = E \times \epsilon.$$

The tensile forces are calculated from the cross sectional surface as well as the tensile stresses, as follows:

$$Fz = A \times \sigma z,$$

with A being the cross sectional surface of the power transmitting element.

The bending stresses can be calculated in the same manner as the tensile stresses, likewise in accordance with the Hooke Law:

$$\sigma b = E \times \epsilon b,$$

with $\sigma b$ representing the bending stress and $\epsilon b$ the elongation.

The bending moments Mby and Mbz are then calculated, as follows:

$$Mb = Wb \times \sigma b,$$

with Wb being the moment of resistance.

Furthermore the maximum bending moments are calculated from $$Mbmax = \sqrt{Mby^2 + Mbz^2}.$$

Finally, the lines of action of the bending moments, i.e, the directions of the bending moments are calculated from $$\tan\alpha = Mbz/Mby$$

To calculate the elongation within the power transmitting elements or the columns of the pressure die casting machine, it is necessary to establish a system of coordinates. To this end, reference is made to FIG. 2. As one can note from this Figure, the x-axis is placed along the longitudinal axis or neutral axis of the column or power transmitting element. The vertical thereto is defined as z-axis, and the horizontal accordingly as y-axis. To calculate the stresses and flexures in the power transmitting element, at least three measuring points are needed on the power transmitting element. The three measuring points define a plane in the system of coordinates. When now the power transmitting element is stressed, the position of the measuring points will change. When a change occurs only in direction of the x-axis (y, z=0) of the origin of coordinates (here, the first plane serving as reference plane is defined), a mere tensile stress is present. Under uneven stress, tensile, compressive, and bending stresses are present which are calculated with the plane equation. In the unstressed condition, the plane should extend perpendicularly to the power transmitting element. In the stressed condition of the power transmission system or element, the direction and position of the respective measuring points will change.

As indicated above, the method of the present invention allows to calculate in a particularly advantageous manner the tensile stress according to the Hooke Law from the elongation and the material-specific modulus of elasticity of the power transmitting element. In a further advantageous manner, is it possible to calculate the tensile force from the cross sectional surface of the power transmitting element and the calculated tensile stress. Likewise, in accordance with the Hooke Law, it is possible to calculate the bending stress from the elongation and the modulus of elasticity of the power transmitting element. From the calculated bending stress again, it is possible to derive the maximum bending moment. Likewise, it is possible to determine the position of the maximum stress.

As regards the two planes plotted on the power transmitting element, it is of special advantage, when in the unstressed condition of the power transmitting element, the planes extend substantially orthogonally to the direction of the power transmission. This arrangement has the great advantage that when the method of the present invention is applied to the monitoring of columns in pressure die casting machines, the planes extend in the unstressed condition of the columns substantially parallel to the clamping plates and orthogonally to the columns or power transmitting elements respectively.

With respect to the determination or establishment of the space coordinates of the two planes, it is particularly advantageous, when this determination occurs by means of noncontacting displacement measuring sensors. Noncontacting displacement measuring sensors are especially advantageous, inasmuch as the "absence of contact" discontinues all further power transmission, which renders the monitoring difficult. These noncontacting displacement measuring sensors measure each against a measuring object. The displacement measuring sensors and the measuring objects associated thereto are stationarily arranged on the power transmitting elements in the region to be monitored, i.e., about firmly connected with the power transmitting element. The space coordinates of the one plane or the displacement measuring sensors respectively result at the location, which corresponds to the zero point of the measurement of the displacement measuring sensors. The space coordinates of the other plane can be derived from the measurement of the displacement measuring sensors against the measuring objects. Consequently, the displacement measuring sensors form with their location the one plane, and the objects to measure, against which the displacement measuring sensors measure noncontactingly, the other plane for monitoring the mechanical power transmission system.

Furthermore, it is particularly advantageous, when the method of the present invention constitutes not only a kind of stationary monitoring, but that rather the correlated or calculated data of the power transmitting element under stress are fed back to the power transmission. Such a feedback can lead in an advantageous manner to a power control, a readjustment of the power transmitting element, or even to an emergency stop of the power transmission system, thereby effectively avoiding damage to the power transmission system.

To carry out the above-described method, an apparatus for monitoring mechanical power transmission systems with at least one power transmitting element is provided, and which is characterized in that a clamping device is provided for engagement with the power transmitting element. The clamping device comprises two clamping pieces practically freely movable relative to one another and adapted for engagement with the power transmitting element in a defined position relative to one another. The first clamping piece in turn comprises at least three, preferably noncontacting displacement measuring sensors which measure against measuring objects associated to the second clamping piece.

In accordance with the invention it has thus been recognized that the planes to be established in accordance with the method of the present invention can be defined by means of a suitable clamping device, the latter being secured in position on the power transmitting element. To enable now the two planes to move relative to one another in the stressed condition of the power transmitting element, the clamping device comprises two clamping pieces practically free movable toward each other, the clamping pieces or the clamping device being attached in the unstressed condition of the power transmitting element, to or on top of the power transmitting element at a defined distance from one another. Since now the plotting of one plane calls for at least three space coordinates, the first clamping piece is provided with at least three, preferably noncontacting displacement measuring sensors. These displacement measuring sensors form already the first plane with their local arrangement and the zero points respectively determined thereby. These displacement measuring sensors measure against objects which are associated with the second clamping piece, with the second plane resulting from this measurement, i.e., from the position of the measuring objects. Finally, in accordance with the method of the present invention, the change in position between the planes is determined by means of the displacement measuring sensors in the stressed condition of the power transmitting element.

In a particularly advantageous manner, the displacement measuring sensors under discussion operate by the eddy-current principle. However, it is no problem to also use noncontacting displacement measuring sensors which operate by induction or capacitance, it being always necessary to observe that electric or electromagnetic fields do not influence the measurement of the displacement measuring sensors.

As regards the constructional configuration of the clamping device or its elements, it is of special advantage that the clamping pieces are constructed as angle brackets, whose legs form an angle of preferably 90°. Naturally, these angle brackets may also form a different angle, it being necessary that on one hand the angle and other hand the size of the legs be always adapted to the power transmitting elements to be monitored. The angular clamping pieces are in particular suitable for monitoring cylindrical power transmitting elements. To be able to associate the clamping pieces with the power transmitting element, for example the column of a pressure die casting machine, in a clear and point-by-point accurate manner, the inside surfaces of the clamping pieces are provided with contact elements having preferably a circular cross section. Such a configuration of the contact elements effects that the clamping pieces, when being placed or tightened on the power transmitting element form with the latter only a point contact on each leg, which leads to an extremely precise definition of the respective plane.

To be able to firmly attach the clamping pieces to the respective power transmitting element, the free ends of the clamping pieces are provided on the one hand with a clamping means preferably in the form of a chain and on the other hand with a tensioning device for tightening the clamping means jointed or attached to the other end. Once the clamping piece is brought in contact with the power transmitting element, the chain is guided around the portion of the power transmitting element which is not enclosed by the angular clamping piece, attached to the other free end of the clamping piece, and tightened by means of the tensioning element. Thus, a tight fit of the clamping piece on the power transmitting element is ensured. In this manner, both clamping pieces, i.e. the clamping piece carrying the displacement measuring sensors and the piece serving as reference object are secured in position.

Furthermore, it is of special advantage, when the displacement measuring sensors measure about orthogonally toward the surface defined by the first clamping piece against the second clamping piece. This second clamping piece for itself is intended to form likewise a surface which is largely orthogonal to the direction of power transmission and thus arranged parallel to the first clamping piece or respectively the surface defined by the first clamping piece.

In order that the displacement measuring sensors associated to the first clamping piece determine reliably the second plane or respectively the distance between the first and the second plane, at least three measuring objects corresponding to the number of the displacement measuring sensors and facing the first clamping piece, are associated to the second clamping piece. The arrangement of the measuring objects has the advantage that while they are physically independent of the second clamping piece, they all undergo as a result of their stationary jointing to the second clamping piece, the change in position of the latter which the displacement measuring sensors determine regardless of the distance between the displacement measuring sensors and the measuring objects. In so doing, it is particularly advantageous, when the measuring objects project from the second clamping piece in direction of the displacement measuring sensors or in direction of the first clamping piece, so that the distance between the displacement measuring sensors and the measuring objects is kept as small as possible, thus easily permitting a noncontacting displacement measurement based on the eddy-current principle or by induction or capacitance respectively. This distance of the measuring objects relative to the displacement measuring sensors can be adjusted, preferably by means of a micrometer screw or the like, so that in the unstressed condition of the power transmission system, all distances can be set to the same values, regardless of slight inclinations of the two planes toward each other.

To protect the arrangement o displacement sensor and measuring object against mechanical influences, and to adequately shield the displacement measuring sensor, for example, with respect to external electromagnetic fields, the displacement measuring sensor is encapsulated in a particular advantageous manner, namely: in a sleeve attached to the first clamping piece and extending in direction of the second clamping piece. The measuring object projecting from the second clamping piece respectively extends into this sleeve in direction of the displacement measuring sensor. As an alternative, the measuring object could be an integral part of a sleeve attached to the second clamping piece and extending in direction of the first clamping piece. In this instance, the displacement measuring sensor projecting from the first clamping piece would extend into the sleeve. Both aforesaid arrangements are basically possible. In the latter instance, the measuring object could advantageously be formed by the bottom of a bore provided in the sleeve, so that the sleeve itself would represent the measuring object.

As regards the assembly of the clamping device or respectively the adjustment of the clamping pieces, it is particularly advantageous, when at least two spacers are provided for insertion between the clamping pieces and connection with the latter. These spacers remain installed between the clamping pieces until the clamping pieces are secured to the power transmitting element. Thus, the clamping pieces are arranged absolutely parallel to one another and adjusted accordingly. Only when the clamping device or clamping pieces are secured in position on the power transmitting element, are the spacers released, preferably via screws, and removed from the clamping pieces to allow a practically free mobility of the latter relative to one another.

To be able to prepare or process the values measured by the displacement measuring sensors in the meaning of the method of the present invention, a computer with a corresponding evaluation program is provided for processing the measured values. If need be, a display and/or printer will be useful for a graphic representation of the evaluated data of the measurement.

The use of the apparatus for monitoring the die closing unit of a pressure die casting machine is only by way of example. In such an instance, at least four power transmitting elements are provided, which are the columns of the die closing unit of the pressure die casting machine. Thus, it is possible to effortlessly monitor with the apparatus and by the method of the present invention the columns of the die closing unit, with the monitoring occurring during the normal pressure die casting process.

The utility and advantages of the present invention are numerous and are not limited to the most preferred embodiment disclosed in detail below.

DETAILED DESCRIPTION

In the following, the apparatus for monitoring mechanical power transmission systems in accordance with the invention will be described with reference to the example of a power transmission system used on a pressure die casting machine. It should be emphasized already at this point that while the following description serves only to explain the teaching of the present invention by way of example, it is by no means limited to pressure die casting machines.

Figure 1:
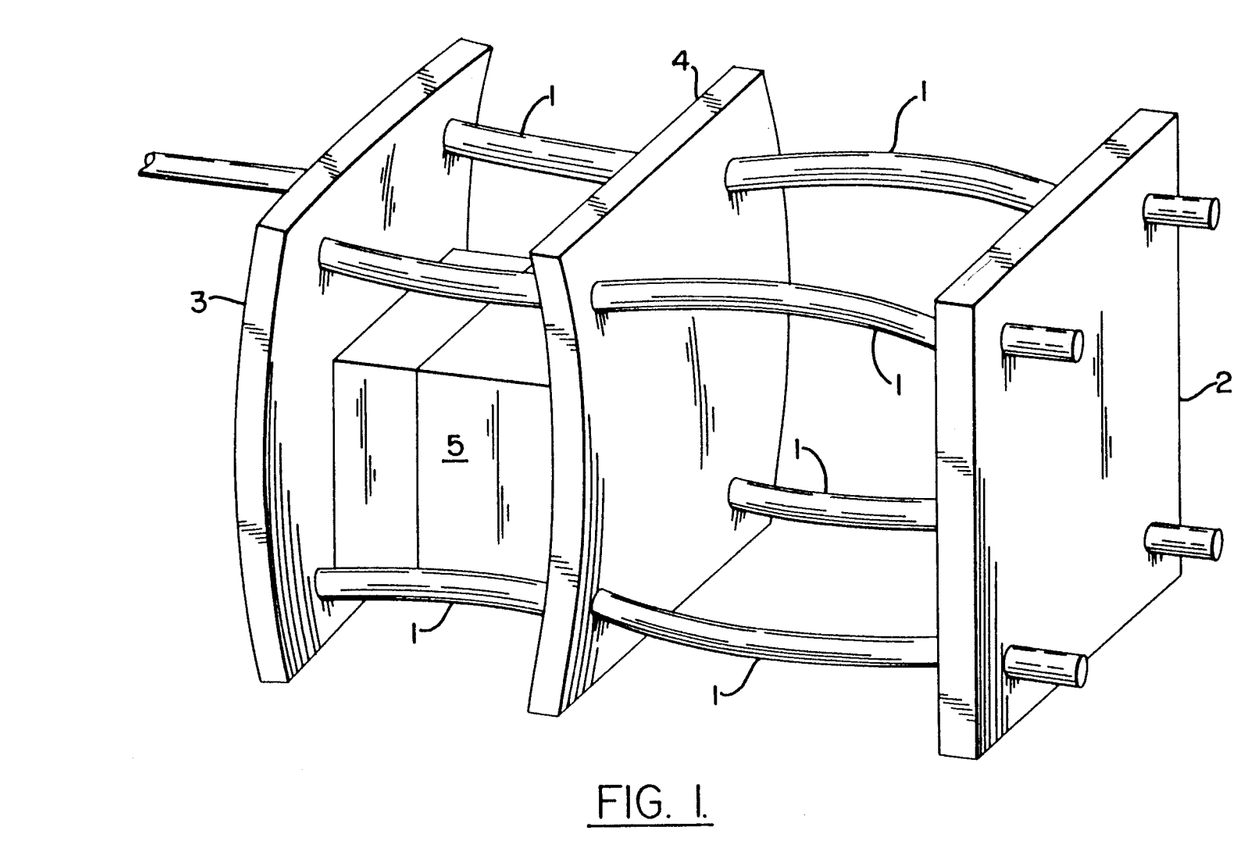
FIG. 1 is a schematic view of the die closing unit of a pressure die casting machine in the stressed condition.

FIG. 1 schematically illustrates the problematic situation arising in principle in power transmission systems to the extent that power transmitting elements 1 constructed in the form of columns are bent to a greater or lesser extent during the closing operation. The schematically illustrated die closing unit of a pressure die casting machine comprises according to the illustration of FIG. 1 besides the power transmitting elements 1, two stationary clamping plates 2, 3 and one movable clamping plate 4. In the here-selected illustration, the die closing unit has just been closed and is held closed, so that a pressure casting die 5 is pushed into the clamping plates 3, 4 in such a manner that the latter 3, 4 deform.

Figure 3:
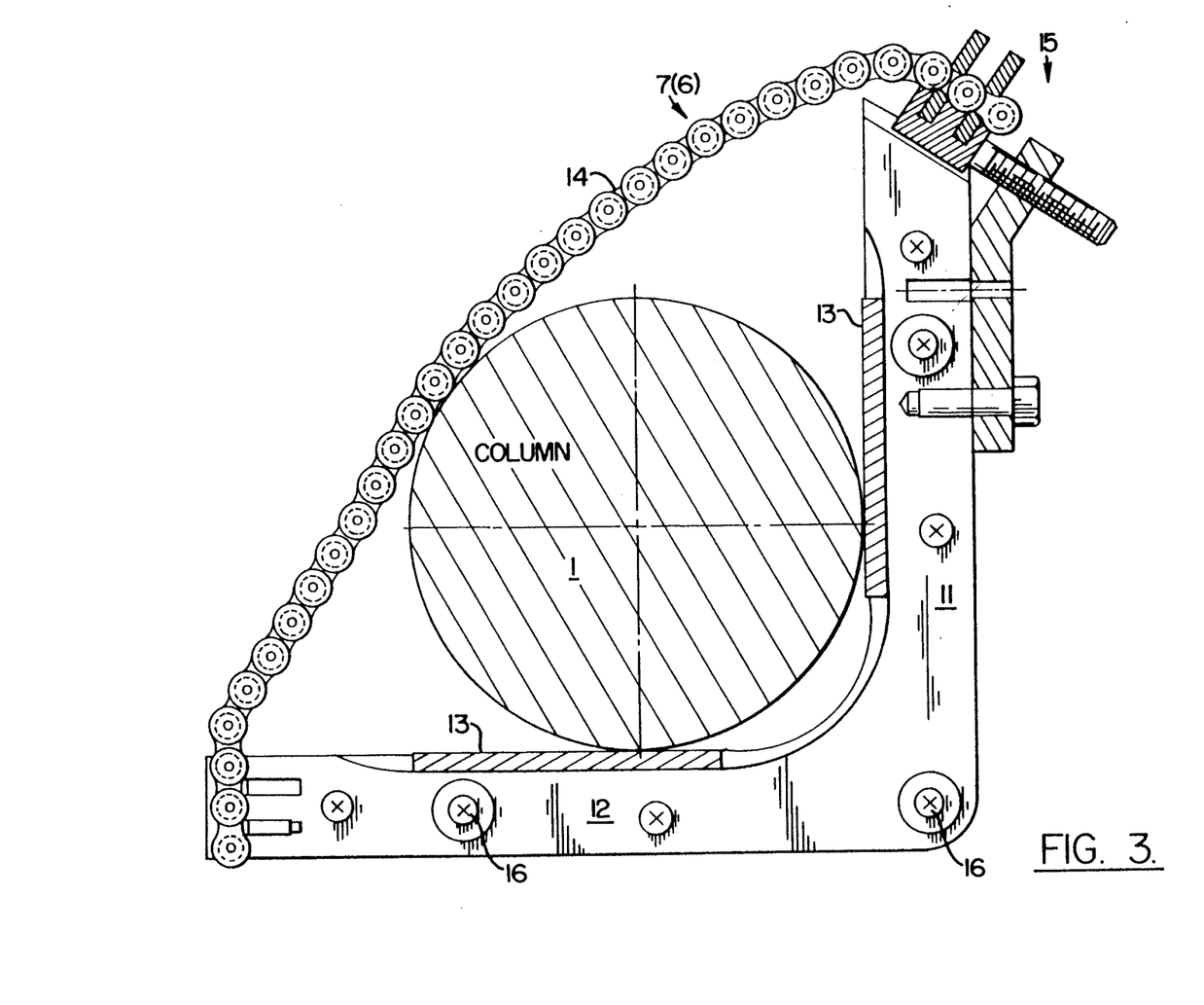
FIG. 3 is a view, partially cut, of a clamping device of an apparatus in accordance with the invention secured in position on a power transmitting element constructed as a column.
Figure 4:
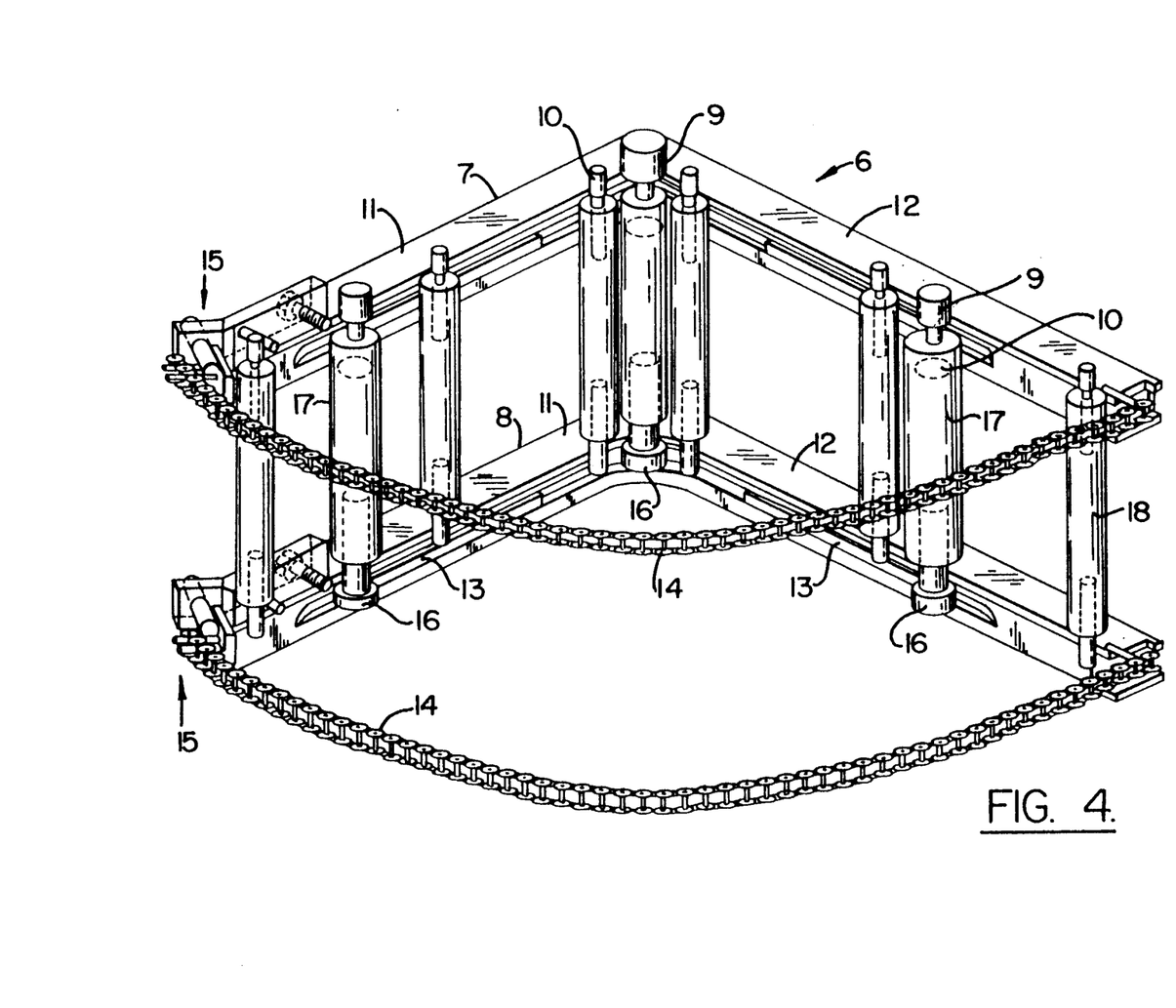
FIG. 4 is a perspective, schematic view of the clamping device shown in FIG. 3 without the power transmitting element.

To monitor the power transmission system of the pressure die casting machine under discussion, or respectively the power transmitting elements 1 of the pressure die casting machine, a clamping device 6 as shown in FIGS. 3 and 4 is provided to be secured in position on the power transmitting element 1. This clamping device 6 comprises two clamping pieces 7, 8 which are practically freely movable toward each other and can be secured in a defined position relative to one another on the power transmitting element 1 as is depicted in the various Figures. The first clamping piece 7 comprises noncontacting displacement measuring sensors 9 which measure against measuring objects 10 associated to the second clamping piece 8. The displacement measuring sensors 9 operate by the eddy-current principle.

As can further be seen particularly clearly in FIGS. 3 and 4, the clamping pieces 7, 8 of the clamping device 6 are constructed as angle brackets whose legs 11, 12 form an angle of 90°. The inside surfaces of the clamping parts 7, 8 are equipped with contact elements 13 which have a circular cross section.

Arranged at the free ends of the clamping pieces 7, 8 are on the one hand a tensioning element 14 in the form of a chain, and on the other hand a tightener 15 for tightening the tensioning element 14 jointed to the other end. The chain, a cable or the like are particularly suitable for use as tensioning element 14, since they occupy only little space and, thus, contribute to a space-saving configuration of the clamping device.

As is further shown in FIGS. 3 and 4, the noncontacting displacement measuring sensors 9 are attached to the first clamping piece 7. Two of the displacement measuring sensors 9 are associated to the outer leg regions and one displacement measuring sensor 9 to the angle region of the first clamping piece 7. As is best seen in FIG. 4, the displacement measuring sensors 9 measure about orthogonally to the surface defined by the first clamping piece 7 against the second clamping piece 8. Associated to the second clamping piece 8 are three measuring objects 10 corresponding to the number of displacement measuring sensors 9 and facing the first clamping piece 7. These measuring objects 10 extend from the second clamping piece 8 in direction of the displacement measuring sensors 9 or respectively in direction of the first clamping piece 7. The distance of the measuring objects 10 relative to the displacement measuring sensors can be adjusted by screws 16 preferably constructed as micrometer screws or the like.

Essential now is that the measuring object 10 is an integral part of a sleeve 17 attached to the second clamping piece 8 and extending in direction of the first clamping piece 7. The displacement measuring sensor 9 projecting from the first clamping piece 7 extends into sleeve 17, but is not firmly connected therewith. The measuring object 10 could now be formed on the one hand by the bottom of a bore provided in the sleeve 17, or on the other hand by the blunt end of a bore arranged in sleeve 17.

To mount the clamping device or respectively adjust the clamping pieces 7, 8, six spacers 18 are arranged according to the illustration of FIG. 4 between the clamping pieces 7, 8, which are connected with the clamping pieces 7, 8. Once the clamping device 6 is secured in position to the power transmitting element 1 as shown in FIG. 3, the spacers 18 are removed so as to enable a relative movement between the clamping pieces 7, 8.

Figure 2:
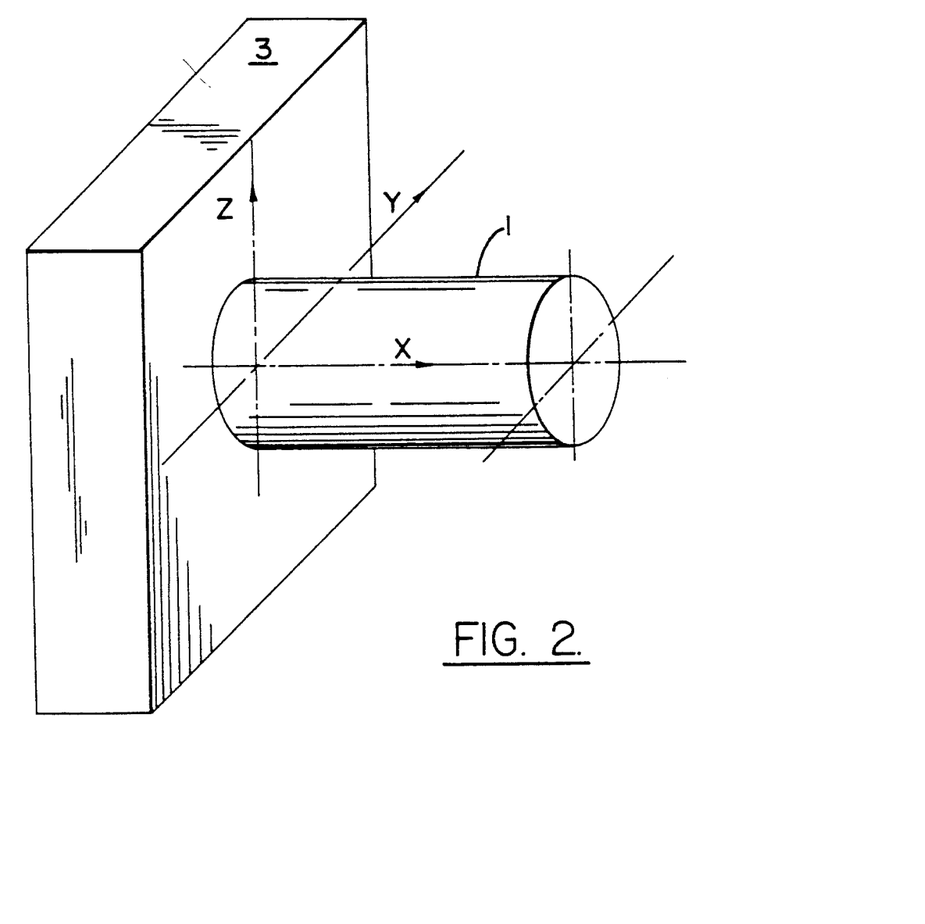
FIG. 2 is a schematic view of a power transmitting element constructed as a column with a clamping plate and an inscribed system of coordinates for computing the elongations in the column.

To carry out the method of monitoring mechanical power transmission systems in accordance with the invention, reference should be made to the general part of the description. Referring only to FIG. 2, it should however be emphasized that the planes to be established or plotted on the power transmitting element, are defined by three space coordinates or measuring points on the power transmitting element. To determine these planes, the system of coordinates illustrated in FIG. 2 will serve, wherein the x-axis is placed along the longitudinal axis or neutral axis of the power transmitting element. The vertical thereto is defined as z-axis, and the horizontal accordingly as y-axis.

Finally, it should be remarked one more time that the foregoing description of only one embodiment of the present invention does not limit the teaching of the invention to the selected embodiment.

That which is claimed is:

1. Method of monitoring mechanical power transmission systems, wherein the power transmitting system comprises at least one power transmitting element, comprising the following steps:
    establishing two, substantially parallel planes on the power transmitting element in an unstressed condition, each plane being defined by at least three space coordinates on the power transmitting element;
    determining the relative change in position of the two planes to one another on the power transmitting element in a stressed condition;
    correlating the determined relative change in position as to local elongation or compression on the power transmitting element; and
    calculating a tensile stress according to a Hooke Law formulation from the elongation and material-specific modulus of elasticity of the power transmitting element.

2. Method as in claim 1, comprising the further step of calculating a tensile force from a cross sectional surface of the power transmitting element and the calculated tensile stress.

3. Method as in claim 1, comprising the further step of calculating the bending stress according to the Hooke law from the elongation and the modulus of elasticity of the power transmitting element.

4. Method as in claim 3, comprising the further step of deriving a maximum bending moment from the bending stress calculated.

5. Method as in claim 1, comprising the further step of determining a maximum stress position on the power transmitting element.

6. Method as in claim 1, wherein in the unstressed condition of the power transmitting element, the planes extend substantially orthogonally to the direction of power transmissions of said systems.

7. Method as in claim 1, wherein the space coordinates of the two planes are determined by means of noncontacting displacement measuring sensors and respectively aligned measuring objects, that the displacement measuring sensors and the measuring objects aligned therewith are stationarily arranged in a range to be monitored, and that the space coordinates of one plane are derived from the location of the displacement measuring sensors, and the space coordinates of the other plane are derived from the measurement of the displacement of the measuring sensors relative to the measuring objects.

8. Method as in claim 1, wherein the calculated data of the stressed power transmitting element are fed back to the power transmission.

9. Method as in claim 8, wherein the feedback leads to either a power control, readjustment of the power transmitting element, or to an emergency stop of the power transmission system.

10. Apparatus for monitoring power transmission systems comprising at least one power transmitting element (1), said apparatus comprising a clamping device (6) for being secured in position on the power transmitting element (1), said clamping device including first and second clamping pieces (7, 8) and means for mounting said first and second clamping pieces (7, 8) to said power transmission element (1) so as to permit free movement of said clamping pieces relative to each other, and wherein said first clamping piece (7) comprises at least three noncontacting displacement measuring sensors (9) and the second clamping piece (8) comprises at least three measuring objects (10), with said measuring objects being operatively associated with respective ones of said sensors so as to permit measurement of the relative movement therebetween.

11. Apparatus as in claim 10, wherein the displacement measuring sensors (9) operate by an eddy-current principle.

12. Apparatus as in claim 10, wherein the displacement measuring sensors (9) operate by induction.

13. Apparatus as in claim 10, wherein the displacement measuring sensors (9) operate by capacitance.

14. Apparatus as in claim 10, wherein the clamping pieces (7, 8) of the clamping device (6) are constructed as angle brackets whose legs (11, 12) form an angle of substantially 90°.

15. Apparatus as in claim 14, wherein the inside surfaces of the clamping pieces (7, 8) include contact elements (13) having preferably a circular cross section.

16. Apparatus as in claim 14, wherein the clamping pieces (7, 8) further comprise free ends which are provided with a tensioning element (14) substantially in the form of a chain connecting the free ends of the clamping pieces, and a tightener (15) on one of said free ends of said clamping pieces for tightening the tensioning element (14) between said free ends.

17. Apparatus as in claim 10, wherein said first clamping piece comprises an angled member which defines outer leg regions and a central angle region, and wherein two of said displacement measuring sensors (9) are mounted adjacent respective ones of said outer leg regions and one of said displacement measuring sensors (9) is mounted adjacent said central angle region.

18. Apparatus as in claim 17, wherein said first clamping piece (7) defines a plane, and wherein the displacement measuring sensors are positioned so as to measure orthogonally to said plane.

19. Apparatus as in claim 17, wherein three measuring objects (10) facing the first clamping piece (7) are associated to the second clamping piece (8), to provide a base measure for the displacement measuring sensors (9).

20. Apparatus as in claim 19, wherein the measuring objects (10) project from the second clamping piece (8) in direction of the displacement measuring sensors (9).

21. Apparatus as in claim 19, wherein the distance between the measuring objects (10) and the displacement measuring sensors (9) is adjustable by means of a micrometer screw (16).

22. Apparatus as in claim 19, wherein each displacement measuring sensor (9) is arranged in a sleeve (17) attached to the first clamping piece (7) and extending in the direction of the second clamping piece (8), and that each measuring object (10) projecting from the second clamping piece (8) extends into the sleeve (17).

23. Apparatus as in claim 19, wherein the measuring object (10) forms an integral part of a sleeve (17) attached to the second clamping piece (8) and extending in the direction of the first clamping piece (7), and that the displacement measuring sensor (9) projecting from the first clamping piece (7) extends into the sleeve (17).

24. Apparatus as in claim 23, wherein the measuring object (10) is formed by the bottom of a bore provided in the sleeve (17).

25. Apparatus as in claim 10, wherein the clamping device (6) comprises at least two spacers (18) which are provided for placement between and connection with the two clamping pieces (7, 8).

26. Apparatus as in claim 10, wherein a computer with a corresponding evaluation program is provided for processing the values measured by the displacement measuring sensors (9), said computer further comprising a display or a printer for graphic representation of the evaluated values of the measurement.

27. Apparatus as in claim 10, wherein at least four power transmitting elements (1) are provided, and that the power transmitting elements (1) are columns of a die closing unit of a pressure die casting machine.

* * * * *